Patented Mar. 25, 1941

2,236,149

UNITED STATES PATENT OFFICE 2,236,149

WELDING ROD

Arthur R. Lytle, Niagara Falls, N. Y., assignor to The Oxweld Railroad Service Company, a corporation of Delaware No Drawing. Application November 2, 1939, Serial No. 302,539

4 Claims. (Cl. 219—8)

The invention relates to welding and refers more specifically to an improved welding rod particularly adapted for use in railway welding, and to a method of building up or repairing railway track members.

The maintenance of railway track presents many problems, one of the more serious and annoying of which is that of wear at the rail joints. Rail ends are subjected to a severe battering action every time a wheel passes over a joint, and, as a result of such pounding, the rail on each side of a joint is progressively worn down, or, sometimes, is badly chipped. This wearing down of the rail surface at joints causes excessive wear on rolling stock, impairs the riding qualities of the rail, and may even endanger the safety of railway operation.

Usually the end of a rail is badly worn down before the rail as a whole has suffered excessive wear. To avoid retiring from service a rail which is worn only on the ends, it has sometimes been the practice to build up, or restore, the ends of a rail by the deposition by welding of additional metal onto the worn surfaces. One material which has proved useful for this purpose is a steel containing 0.5% to 3% chromium, 0.2% to 1% carbon, 0.5% to 1.75% manganese and 0.3% to 1.5% silicon.

This material is hard, resistant to wear and is easily deposited by welding. However, there is a demand for an even harder material. Attempts to satisfy this demand by changing the composition of the steel to include a higher proportion of hardening alloys or by using different welding methods have been succesful in increasing hardness only at the expense of increased brittleness.

Another problem met in repairing rail ends arises because the wear on a rail is not uniform but varies rather widely, particularly at the joint. Thus, a rail may be worn down for from 2 to 7 inches from a joint, the greatest wear occurring at that portion of the rail immediately adjacent the joint, while less wear occurs at those portions of the rail which are distant from the joint. Accordingly, a nonuniform layer of weld metal must be deposited on the end of a rail to build it up to its normal height, but the deposited weld metal must be of uniform hardness to prove satisfactory.

It has been observed that with the use of welding rods of the compositions formerly employed for repairing rail ends such uniformity is not easily obtainable. For example, in the typical case where a deposit of varying thickness is necessary, the thinner deposits of weld metal, away from the rail end, cool rapidly and a relatively hard deposit is obtained at those points. At the rail ends, where a thicker deposit of weld metal is required, the deposited metal cools more slowly, and, when welding rods of the old type are used, the resulting deposit is considerably softer than the deposit obtained at points away from the rail end. Accordingly, at the point of maximum wear, where the greatest hardness is required, a softer deposit is obtained than is produced where less hardness is required. This effect is due to a characteristic of those steels formerly used for repairing rails which is known as "heat sensitivity," and is, of course, a real disadvantage.

It is an object of this invention to provide an improved welding rod producing a deposit of weld metal which is hard, tough and wear-resistant. Another object of the invention is to provide a welding rod particularly suited for use in building up railway track members. A further object is a welding rod which produces on welding a deposit of metal free from heat sensitivity. Other objects of the invention will become apparent from the following description.

The invention is based on the discovery that a welding rod containing a small proportion of tungsten in addition to chromium, manganese, and silicon, remainder iron and incidental impurities, has the necessary characteristics for producing a deposit of weld metal that is harder and tougher than the compositions heretofore used in building up worn railway track members. Accordingly, the invention comprises a welding rod which contains about 0.1% to 0.35% tungsten, and 0.8% to 1.2% chromium, the remainder substantially all iron together with incidental impurities. Preferably, the carbon content of the welding rod is about 0.35% to 0.6%; manganese in a proportion of 0.9% to 1.3% and silicon in a proportion of 0.5% to 0.95% are preferably included in the welding rod.

Tests have proved that deposits of weld metal made from a welding rod of this composition are hard, tough and wear-resistant. For example, a welding rod containing 0.24% tungsten together with a small proportion of chromium was used for building up rail ends by oxyacetylene welding. The deposited metal had a Brinell hardness of 340, yet the weld deposit withstood more than two million passes of a hardened steel wheel loaded to 52,000 pounds without signs of failure.

Another important advantage of the use of the welding rod of this invention lies in the freedom from heat sensitivity of the deposited weld metal. This characteristic has been demonstrated in actual tests. For example, two rail joints were built up under identical conditions by oxyacetylene welding. In each case the tread surface of the rails to be armored was ground for several inches back from the rail ends, the proportion of metal removed increasing toward the rail ends, so that the rail heads were tapered downwardly toward the rail ends. Thus, to build the rails up to their normal condition, a thicker deposit of weld metal was required at the rail ends than was necessary at those portions of the rails distant from the ends. The weld metal was deposited in a continuous manner in each test. In one test the deposit was produced from welding rod A which contained 0.41% carbon, 1.15% manganese, 0.64% silicon and 1.12% chromium, and in the other test the deposit was made from welding rod B which was of the same composition as welding rod A but contained in addition 0.12% tungsten. Scleroscope hardness tests were made on each deposit as indicated in the following table.

|  | Weld metal 2½ in. from rail ends | Weld metal 1 in. from rail ends | Rail ends | Weld metal 1 in. from rail ends | Weld metal 2½ in. from rail ends |
|---|---|---|---|---|---|
| Rod A | 50–55 | 45–48 | 38–40  42–44 | 48–52 | 44–45 |
| Rod B | 52–54 | 53–55 | 50–52  50–52 | 55–57 | 52 |

It will be seen that the deposit produced by welding rod A varied in hardness rather widely, the softest portion of the deposit occurring at the rail ends where the deposit was thickest, while the deposit produced from welding rod B was of substantially uniform hardness. Because of the freedom from heat sensitivity of the welding rods of this invention, a series of deposits of different depths made with this rod will be of substantially the same hardness. Deposits of weld metal produced from such rods have a hardness between about 300 and 400 Brinell (3000 kg. load); generally the hardness is in the neighborhood of 350 Brinell.

A preferred composition of a welding rod according to this invention is 0.4% to 0.55% carbon, 1% to 1.2% manganese, 0.55% to 0.75% silicon, 1% to 1.2% chromium and 0.1% to 0.25% tungsten, remainder iron. While specific examples have been described in detail, these examples are given by way of illustration, and the invention is not limited thereby.

I claim:

1. In a hardenable chromium steel welding rod, containing less than 3% chromium, for use in depositing a layer of armoring metal upon a heavy, cold metal base by oxy-fuel gas fusion-deposition welding, between 0.1% and 0.35% tungsten which imparts to said steel the characteristic of hardening to substantially the same hardness despite variations in the rate at which it cools from welding temperatures.

2. In a chromium steel welding rod, containing 0.8% to 1.2% chromium, for use in depositing a self-hardening layer of armoring metal upon a heavy, cold metal base by oxy-fuel gas fusion-deposition welding, between 0.1% and 0.35% tungsten which imparts to said steel the characteristic of hardening to a hardness in the neighborhood of 350 Brinell despite variations in the rate at which it cools from welding temperature.

3. In a steel welding rod, containing 0.8% to 1.2% chromium, 0.5% to 0.95% silicon, 0.9% to 1.3% manganese and 0.35% to 0.6% carbon, for use in depositing a self-hardening layer of armoring metal upon a heavy, cold metal base by oxy-fuel gas fusion-deposition welding, between 0.1% and 0.35% tungsten which imparts to said steel the characteristic of hardening to a hardness in the neighborhood of 350 Brinell despite variations in the rate at which it cools from welding temperature.

4. Welding rod comprising 0.1% to 0.35% tungsten; 0.8% to 1.2% chromium; 0.5% to 0.95% silicon; 0.9% to 1.3% manganese; 0.35% to 0.6% carbon; the remainder iron and incidental impurities.

ARTHUR R. LYTLE.